US007159383B2

(12) United States Patent
Barton et al.

(10) Patent No.: US 7,159,383 B2
(45) Date of Patent: Jan. 9, 2007

(54) APPARATUS, METHOD AND SYSTEM FOR GAS TURBINE ENGINE NOISE REDUCTION

(75) Inventors: Brian E. Barton, deceased, late of Chula Vista, CA (US); by Fiona H. Barton, legal representative, Bonita, CA (US); David C. Brice, Bonita, CA (US); Julia K. Whitmire, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 10/343,566

(22) PCT Filed: Oct. 2, 2001

(86) PCT No.: PCT/US01/30862

§ 371 (c)(1),
(2), (4) Date: Sep. 11, 2003

(87) PCT Pub. No.: WO02/29232

PCT Pub. Date: Apr. 11, 2002

(65) Prior Publication Data

US 2004/0237501 A1    Dec. 2, 2004

Related U.S. Application Data (60) Provisional application No. 60/237,314, filed on Oct. 2, 2000.

(51) Int. Cl.
*F02K 3/02* (2006.01)
(52) U.S. Cl. .................. 60/226.1; 60/204; 239/265.19
(58) Field of Classification Search .................. 60/204, 60/208, 211, 230, 231, 770, 226.1, 262, 263, 60/264, 226.3; 239/265.11, 265.19, 265.23, 239/265.17, 265.29, 265.31; 181/213, 220
See application file for complete search history.

(56) References Cited

U.S. PATENT DOCUMENTS

| 3,527,317 | A |   | 9/1970 | Motsinger ..................... 181/35 |
| 4,215,536 | A | * | 8/1980 | Rudolph ....................... 60/262 |
| 4,501,393 | A | * | 2/1985 | Klees et al. ........... 239/265.13 |
| 5,435,127 | A | * | 7/1995 | Luffy et al. ................... 60/204 |

(Continued)

FOREIGN PATENT DOCUMENTS

EP    01979396.7    1/2005

OTHER PUBLICATIONS

Saiyed, et al., 2000, American Institute of Aeronautics & Astronautics, "Acoustics and Thrust Of Separate-Flow Exhaust Nozzles With Mixing Devices For High-Bypass-Ratio Engines."

(Continued)

*Primary Examiner*—William H. Rodriguez
(74) *Attorney, Agent, or Firm*—Goodwin Procter LLP (57) ABSTRACT

An apparatus for reducing gas turbine engine noise, such as noise generated by an aircraft gas turbine engine, comprises at least one and preferably a plurality of gas injectors for injecting gas such as high pressure engine bleed air, diverted core air, air obtained from a pressurized storage container or air obtained from a synthetic jet actuator into the area proximate to one or more engine nozzle portions, thereby disrupting the noise-generating gas streams generated by the engine exhaust and the travel of the airplane through the air. The apparatus is particularly useful for reducing engine noise during the takeoff period of aircraft flight.

17 Claims, 10 Drawing Sheets

U.S. PATENT DOCUMENTS

| | | | |
|---|---|---|---|
| 5,664,415 A * | 9/1997 | Terrier | 60/204 |
| 5,706,650 A * | 1/1998 | Thayer | 60/231 |
| 5,758,823 A * | 6/1998 | Glezer et al. | 239/4 |
| 5,775,095 A * | 7/1998 | Zysman et al. | 60/204 |
| 5,884,843 A * | 3/1999 | Lidstone et al. | 239/265.13 |
| 5,947,412 A | 9/1999 | Berman | 244/1 N |
| 5,957,413 A * | 9/1999 | Glezer et al. | 244/208 |
| 6,056,204 A * | 5/2000 | Glezer et al. | 239/8 |
| 6,070,407 A * | 6/2000 | Newton | 60/226.1 |
| 6,164,059 A * | 12/2000 | Liang et al. | 60/230 |
| 6,227,800 B1 | 5/2001 | Spring et al. | 415/116 |
| 6,336,319 B1 * | 1/2002 | Koshoffer | 60/770 |
| 6,470,669 B1 * | 10/2002 | Jones et al. | 60/231 |
| 6,679,048 B1 * | 1/2004 | Lee et al. | 60/204 |
| 6,786,038 B1 * | 9/2004 | Lair | 60/226.1 |
| 2002/0073690 A1 * | 6/2002 | Tse | 60/204 |
| 2004/0187474 A1 * | 9/2004 | Martens et al. | 60/204 |

OTHER PUBLICATIONS

Kinzie, et al., 2004, Williamsburg, Virginia Active 04, "Fluidic Chevrons for Jet Noise Reduction."

* cited by examiner

FIG. 5A WEDGE 82
FIG. 5B SAWTOOTH TAB 84
FIG. 5C AIR INJECTION 86

FLOW 88 BEHIND THE SAWTOOTH TAB MIXER

FIG. 6

Flow Visualization From The Side Of The Air Injection Mixer

AIR INJECTION
TURNED OFF

FIG. 7A

Flow Visualization From The Side Of The Air Injection Mixer

AIR INJECTION
TURNED ON

FIG. 7B

Flow Visualization From The End
Of The Air Injection Mixer

AIR INJECTION
TURNED OFF

FIG. 8A

Flow Visualization From The End
Of The Air Injection Mixer

AIR INJECTION TURNED
ON (0.09 $lb_m/s$)

FIG. 8B

Flow Visualization From The End
Of The Air Injection Mixer

AIR INJECTION TURNED
ON (0.16 $lb_m/s$)

FIG. 8C

Representative Flow Patterns From Various Mixer Designs

WEDGE MIXER
FIG. 9A

Representative Flow Patterns From Various Mixer Designs

SAWTOOTH TAB MIXER
FIG. 9B

Representative Flow Patterns From Various Mixer Designs

AIR INJECTION MIXER WITH AIR OFF
FIG. 9C

Representative Flow Patterns From Various Mixer Designs

AIR INJECTION MIXER WITH AIR ON (0.16 $lb_m/s$)
FIG. 9D

Possible Combination Injection/Wedge Mixer

FIG. 10

APPARATUS, METHOD AND SYSTEM FOR GAS TURBINE ENGINE NOISE REDUCTION

CROSS-REFERENCE TO RELATED APPLICATIONS

This is a national application for International Application No. PCT/US01/30862, which was filed on Oct. 2, 2001 and which published in English on Apr. 11, 2002, which in turn claims priority from U.S. Provisional Application Ser. No. 60/237,314, which was filed on Oct. 2, 2000.

BACKGROUND OF THE INVENTION

1. Field of the Invention

This invention relates to an apparatus, method and system for reducing the noise generated by gas turbine engines, particularly aircraft gas turbine engines. More particularly, this invention relates to an apparatus in which a separate gas stream such as air is introduced at one or more engine nozzle portions to disrupt the noise-generating gas streams ordinarily generated by the engine exhaust. The method and system of this invention use such an apparatus to reduce gas turbine engine noise, particularly during high noise generating periods such as aircraft takeoff.

2. Background Information

The desirability of reducing noise generated by gas turbine engines is well known to those skilled in the art. More particularly, it is well known that gas turbine engines used in aircraft generate undesirable noise levels, particularly during the takeoff period of the aircraft. Extensive testing on using tabs and chevrons in aircraft gas turbine engine exhaust mixers have shown promise in reducing engine exhaust noise during takeoff. It is believed that such tabs and chevrons break up the large scale, low frequency exhaust flow into smaller, high frequency components. These high frequency components are believed to dissipate quickly in the atmosphere without reaching the ground. However, the performance losses associated with the use of such tabs and chevrons becomes prohibitive for long range aircraft where cruise performance is the driving design parameter. Accordingly, it is desirable to employ a method, apparatus and system for reducing noise in such engines which avoids such detrimental cruise performance losses.

Accordingly, it is one object of this invention to provide an apparatus to reduce gas turbine engine noise, particularly during high noise generating periods such as aircraft takeoff, while minimizing aircraft cruise performance losses. In the apparatus of this invention at least one separate gas stream is introduced proximate to or at one or more engine nozzle portions to disrupt the noise-generating gas streams ordinarily generated by the engine exhaust. The method and system of this invention use such an apparatus to reduce gas turbine engine noise, particularly during high noise generating periods such as aircraft takeoff, yet avoid or minimize detrimental cruise performance losses. Other objects, features and advantages of the apparatus, method and system of this invention will be apparent from the detailed description herein.

SUMMARY OF THE INVENTION

This invention is directed to an apparatus, method and system for reducing gas turbine engine noise, such as noise generated by an aircraft gas turbine engine particularly during high noise generating periods such as aircraft takeoff, while minimizing aircraft cruise performance losses. More specifically, in the apparatus of this invention a separate gas stream, preferably high pressure air such as engine bleed air, diverted core air or air from a pressurized storage container or a combination thereof is introduced in an area proximate to one or more engine nozzle portions to disrupt the noise-generating gas streams ordinarily generated by the engine exhaust and the travel of the airplane through the air. The gas may be injected using, for example, at least one gas injector which introduces the gas in the desired area The gas may be as a steady or continuous stream, or may be injected in a pulsing manner in which either all of the injectors pulse simulataneously or the injectors pulse sequentially around the perimeter of the engine nozzle portion or portions. Alternatively, one or more synthetic jet actuators located proximate to at least one trailing edge of at least one engine nozzle portion may be used to introduce the desired gas stream into the desired location. The gas injector or injectors and one or more synthetic jet actuators may also be used in combination to achieve the desired gas injection. The apparatus of this invention comprises at least one, and preferably a plurality of, gas injectors, synthetic jet actuators or combinations thereof for introducing gas into the area proximate to one or more engine nozzle portions. Various configurations and locations for the gas injectors, synthetic jet actuators, or combinations thereof, as described herein, may be employed to achieve the desired noise reduction.

The method of this invention is a method for reducing noise generated by an aircraft gas turbine engine, the method comprising:

(a) providing an apparatus for reducing noise generated by a gas turbine engine, the apparatus comprising at least one, and preferably a plurality of, gas injectors, synthetic jet actuators or a combination thereof for injecting gas into the area proximate to one or more engine nozzle portions ; and (b) introducing gas into the apparatus during a takeoff portion of aircraft flight, wherein the gas is injected proximate to one or more engine nozzle portions to disrupt the noise-generating gas streams.

In the system of this invention, noise generated by an aircraft gas turbine engine is reduced using a system comprising:

(a) a source of gas such as air; and (b) an apparatus for reducing noise generated by a gas turbine engine, the apparatus comprising at least one, and preferably a plurality of, gas injectors or synthetic jet actuators or both for injecting the gas into the area proximate to one or more engine nozzle portions.

In the method and system of this invention, the introduction of gas such as air into the apparatus is preferably halted during the cruise portion of the aircraft flight to avoid or reduce performance losses.

DETAILED DESCRIPTION OF THE INVENTION

This invention is directed to an apparatus, method and system for reducing gas turbine engine noise, particularly during high noise generating periods such as aircraft takeoff, while minimizing aircraft cruise performance losses. More specifically, in the apparatus of this invention at least one separate gas stream such as an air stream is introduced proximate to one or more engine nozzle portions such as the fan nozzle, core nozzle or both to disrupt the noise-generating gas streams ordinarily generated by the engine exhaust. The purpose of the introduction of the separate gas stream or streams is to create the same effect as a mechanical tab mixer, but to avoid or minimize aircraft cruise performance losses typically associated with such mechanical mixers. This introduction of gas such as air has the advantage of disturbing the flow during takeoff (with some possible attendant performance loss due to, for example, engine bleed air required for injection). However, during cruise, the air supply would preferably be turned off so there would be no loss in performance such as bleed air penalty. The introduced gas may be air obtained for example from a high pressure air source such as engine bleed air, diverted core air or air from a pressurized storage container, and injected into the desired location via gas injectors. Alternatively, one or more synthetic jet actuators (described further herein) located proximate to at least one trailing edge of at least one engine nozzle portion may be used to introduce the desired gas stream into the desired location. In the method and system of this invention, the apparatus of this invention is installed on a gas turbine engine such as an aircraft gas turbine engine, and the gas injector or injectors, if employed, may be supplied with a separate source of gas such as engine bleed air, diverted core air or air from a pressurized storage container via duct work, a plenum or the like during takeoff to reduce engine noise associated with the engine's exhaust. The apparatus is responsively interconnected to a control system which enables the separate gas source supply to be turned off during the cruise or other portions of the aircraft's flight.

Figures 1A, 1B, 1C:
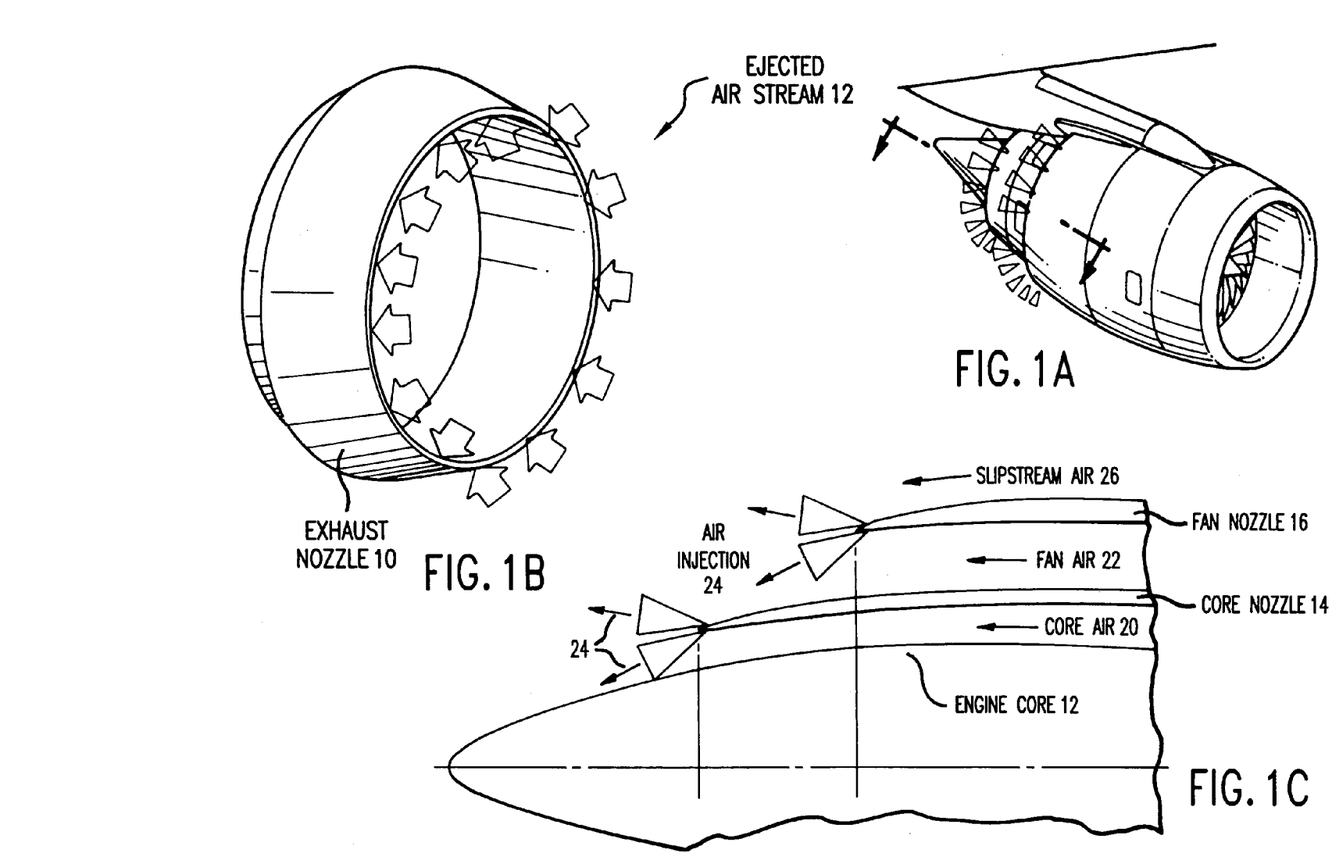
FIG. 1A depicts an aircraft gas turbine engine and shows a preferred location of the apparatus of this invention on the engine.
FIG. 1B depicts an embodiment of the apparatus of this invention in which mixing of the noise-generating gas streams is achieved by injecting air directly into the fan and core streams at the engine nozzle exit plane, as shown in further detail in FIG. 1F.
FIG. 1C depicts a cross-sectional view of the aircraft gas turbine engine core, air flow patterns and theorized gas flow patterns with respect to the apparatus of this invention.

An overall illustration of the invention is set forth in FIGS. 1A–1C. FIG. 1A depicts an aircraft gas turbine engine and shows the location of the apparatus of this invention on the engine. FIG. 1B depicts one embodiment of the apparatus of this invention, discussed further herein with respect to FIG. 1F. FIG. 1C depicts a cross-sectional view of an aircraft gas turbine engine core, air flow patterns and theorized gas flow patterns with respect to the apparatus of this invention. More, particularly, in FIG. 1C, embodiments of this invention are depicted in which air such as engine bleed air, diverted core air, air from a pressurized storage container or air obtained from a synthetic jet actuator may be injected either proximate to the core nozzle, injected proximate to the fan nozzle, or both. If the air is injected proximate to the core nozzle, the injected air is intermixed with the core air as well as fan air, as shown. If the air is injected proximate to the fan nozzle, the injected air is intermixed with the fan air as well as slipstream air, as shown. Air injection has a greater effect on noise reduction if injected proximate to the core nozzle due to the high differential air velocities at the core air-fan air interface. Air injection has a lesser but valuable effect on noise reduction if injected proximate to the fan nozzle due to the lower differential air velocities at the fan air-slipstream air interface.

Figure 1D:
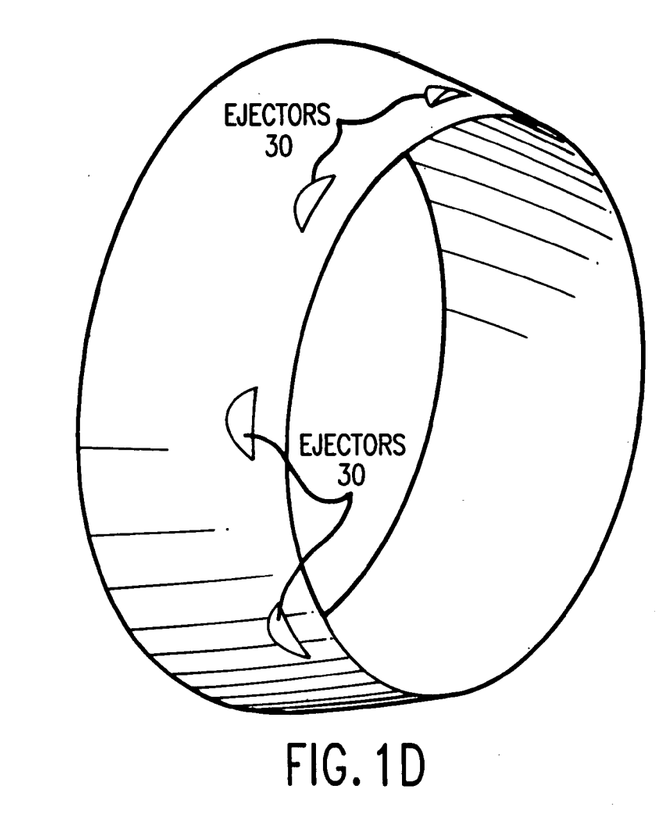
FIG. 1D depicts an embodiment of the apparatus of this invention in which the aircraft gas turbine engine exhaust nozzle has crescent-shaped injectors for injecting air on the fan flow side aft of the nozzle exit plane.

An illustration of another embodiment of the apparatus of this invention is shown in FIG. 1D, which depicts an aircraft gas turbine engine exhaust nozzle having crescent-shaped injectors for injecting air on the fan flow side aft of the nozzle exit plane. Similar injectors may optionally also be added to the core side. The injectors receive the air from piping, ducting, a plenum or a synthetic jet actuator (not shown).

Figure 1E:
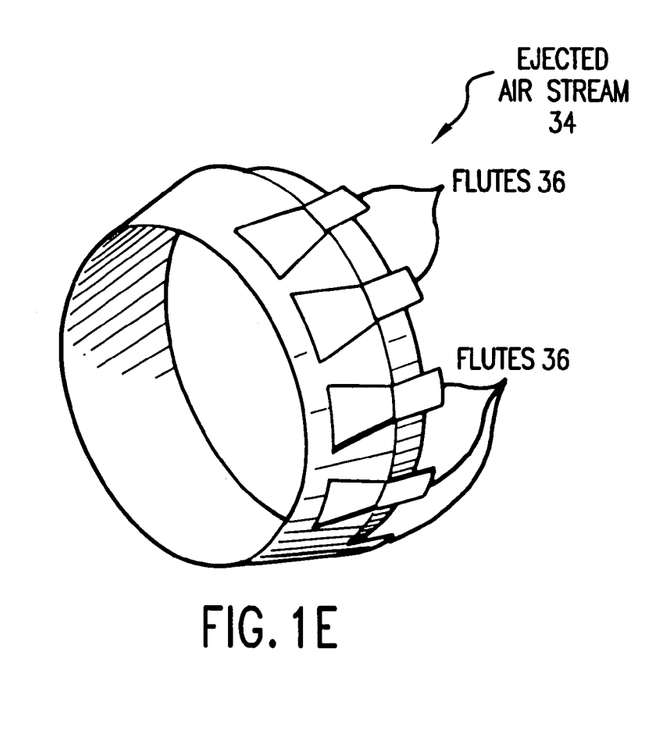
FIG. 1E depicts an embodiment of the apparatus of this invention in which the aircraft gas turbine engine exhaust nozzle has injectors for ejecting air from under the core cowl of the engine.

An illustration of another embodiment of the apparatus of this invention is shown in FIG. 1E, which depicts an aircraft gas turbine engine exhaust nozzle having injectors for injecting air from under the core cowl of the engine. The nozzle may optionally have flutes to direct and control the air to the core exhaust plane, as shown The injectors receive the air from piping, ducting, a plenum or a synthetic jet actuator (not shown).

Figure 1F:
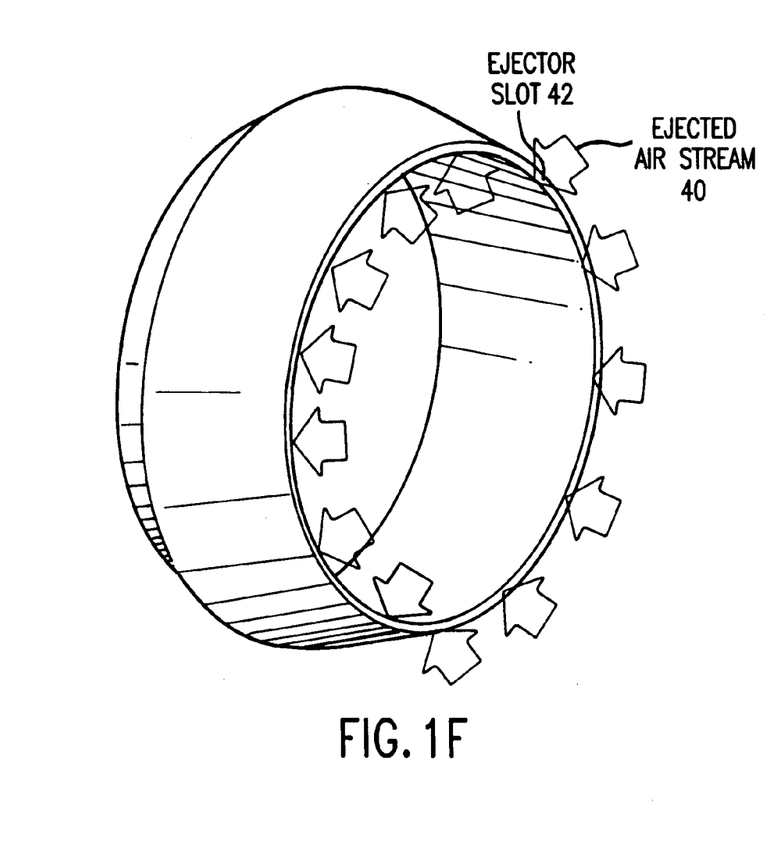
FIG. 1F depicts an embodiment of the apparatus of this invention in which mixing of the noise-generating gas streams is achieved by injecting air directly into the fan and core streams at the engine nozzle exit plane.

An illustration of another embodiment of the apparatus of this invention is shown in FIG. 1F, which depicts the aircraft gas turbine engine exhaust nozzle of FIG. 1B in greater detail. In this embodiment, mixing of the gas streams is achieved by injecting air directly into the fan and core streams at the nozzle exit plane. The shape of the holes used for injection may range from slotted as shown to round, or a combination thereof. The angle of penetration may be varied from streamwise with the flow to streamwise against the flow, or any intermediate position therebetween. The injectors receive the air from piping, ducting, a plenum or a synthetic jet actuator (not shown).

Figure 1G:
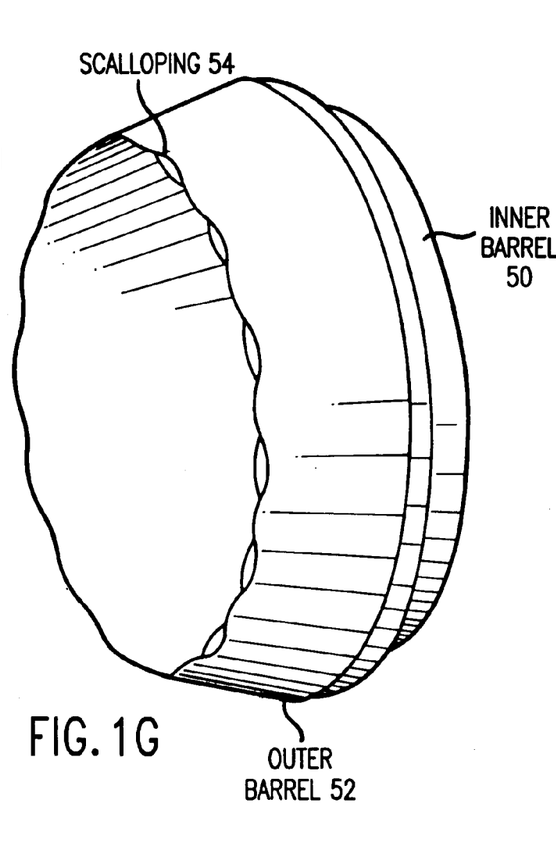
FIG. 1G depicts an embodiment of the apparatus of this invention in which air is supplied to injectors via an air delivery tube and injected between inner and outer scalloped barrels of an aircraft gas turbine engine exhaust nozzle.
Figure 1H:
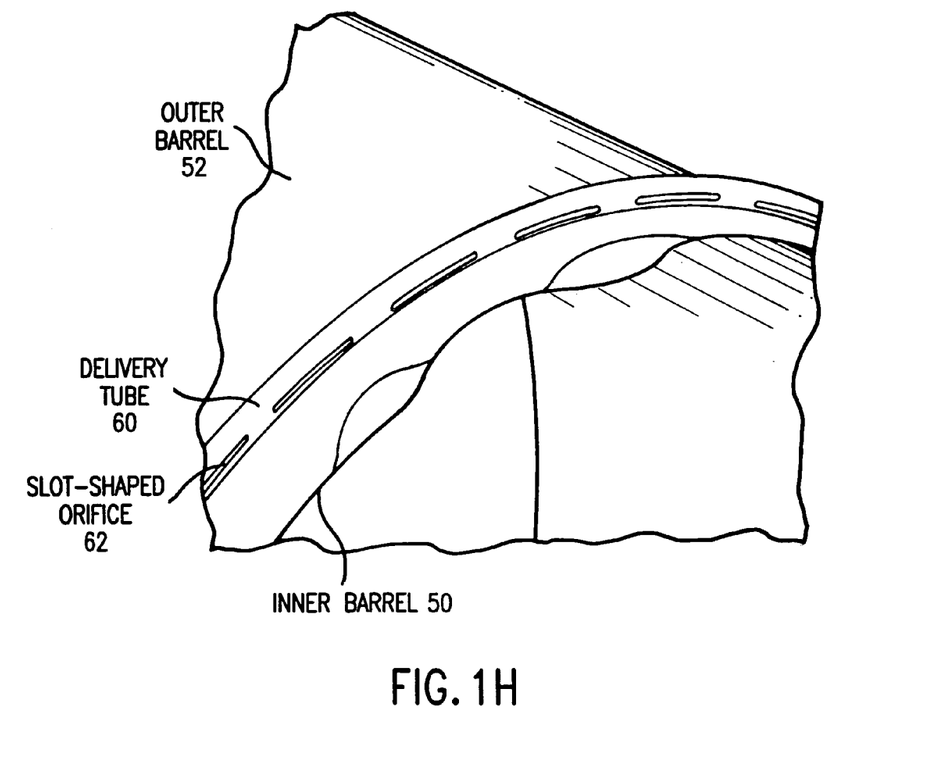
FIG. 1H depicts an embodiment of the apparatus of this invention as depicted in FIG. 1G in which the delivery tube is located proximate or just forward of the exhaust plane.

An illustration of another embodiment of the apparatus of this invention is shown in FIGS. 1G and 1H. In this embodiment, air is injected between the inner and outer barrels of an aircraft gas turbine engine exhaust nozzle from an air delivery tube which runs around the entire 360 degree circumference of the exhaust nozzle, as shown in greater detail in FIG. 1H. As is also depicted in FIG. 1G, in a preferred embodiment the inner and outer barrels may be scalloped to provide a local shroud to either direct the air into the fan stream or the core flow. As depicted in FIG. 1H, in a preferred embodiment the delivery tube is positioned proximate or just forward of the exhaust plane. The air delivery tube is fed air from piping, ducting, a plenum or a synthetic jet actuator (not shown). In the embodiment of FIG. 1H, the delivery tube has slot-shaped injector orifices, although circular-shaped orifices may also be used, or combinations of slot-shaped and circular-shaped orifices. Other orifice shapes may also be used, either alone or in combination with the slot-shaped and circular-shaped orifices.

As discussed above, in one embodiment of this invention one or more synthetic jet actuators may be used to provide the air injected into the desired location. As is well known to those skilled in the art, a synthetic jet actuator operates by intaking a gas such as air from a given location and injecting the gas proximate to the same location with a forced velocity sufficient to induce a vortex stream into the desired flow region. In this invention, one or more synthetic jet actuators may be employed, for example, to intake air from the region proximate to the nozzle region of an aircraft engine (as depicted, for example, in FIG. 1C) and inject the air with a forced velocity sufficient to induce a vortex stream into the desired flow region (e.g. the core air flow region, the fan air flow region, or a combination thereof, as depicted in FIG. 1C). The synthetic jet actuator, if employed, does not cause any additional air or gas mass flow rate to be added to the engine nozzle flow. In this invention, one or more synthetic jet actuators may be employed without additional air sources to achieve the desired air injection, or one or more synthetic jet actuators may be used in combination with one or more air or gas sources such as engine bleed air, diverted core air, a separate pressurized air storage container and the like to achieve the desired air injection at the desired location. Without wishing to be bound by any one theory, it is believed that use of one or more synthetic jet actuators in this invention is advantageous because performance losses such as bleed air losses will not be incurred or will be minimized. Synthetic jet actuators are well known to those skilled in the art, and synthetic jet actuators which may be employed in this invention are described, for example, in U.S. Pat. Nos. 5,758,823; 5,957,413; and 6,056,204 as well as Lachowicz et al. "Physical Analysis and Scaling of a Jet and Vortex Actuator," in 3rd Joint ASME/JSME Fluids Engineering Conference, San Francisco, Calif. (Jul. 18–22, 1999) (FEDSM99-6921) (referred to herein as Lachowicz et al.), all of which are incorporated herein by reference in their entirety.

More particularly, in one embodiment of this invention the synthetic jet actuator employed is as described in U.S. Pat. No. 5,040,560, in which the jet actuator employs one or more piezoelectric actuators to obtain controlled disturbances within the primary flow stream (e.g. the core air flow, engine air flow or combination thereof as depicted in FIG. 1C of this application.

In another embodiment of this invention, the synthetic jet actuator employed is as described in U.S. Pat. No. 5,758,823, in which the actuator comprises a housing defining an internal chamber. An orifice is present in a wall of the housing, and a mechanism is included in or proximate to the housing to periodically change the volume within the internal chamber so that a series of fluid vortices are generated and projected externally from the housing orifice. The volume changing mechanism may be, for example, a piston positioned in the jet housing so that fluid is moved in and out of the orifice during reciprocation of the piston. A flexible diaphragm may be used as a wall of the housing to act in conjunction with the volume changing mechanism. A control system is used to create time harmonic motion of the diaphragm, such that as the diaphragm moves into the chamber, thereby decreasing the chamber volume, fluid is ejected from the chamber through the orifice. As the fluid passes through the orifice, the flow separates at the sharp edges of the orifice and creates vortex sheets which roll up into vortices. These vortices move away from the edges of the orifice under their own self-induced velocity, thereby synthesizing a fluid jet.

In another embodiment of this invention, the synthetic jet actuator employed is as described in the first preferred embodiment of U.S. Pat. No 5,957,413, in which the actuator is as described in U.S. Patent No. 5,758,823, and the flexible diaphragm employed therein may be actuated by a piezoelectric actuator or other appropriate means. In this embodiment, the actuator may also be further modified to include a device or mechanism for withdrawing fluid into the chamber and for forcing fluid out of the chamber through the orifice. At least one louver is attached to the housing and is aligned with an opening formed in the housing. The louver is a one way valve and only permits fluid flow in one direction. Accordingly, the louver permits fluid flow either into the chamber through the opening or out of the chamber through the opening. The louver may be a passive louver or an active louver, such as a louver whose position is at least partially controlled by a piezoelectric material or other suitable means. In another embodiment of this invention, the synthetic jet actuator employed is as described in the second preferred embodiment of U.S. Pat. No 5,957,413, in which the actuator is embedded in a body and operates through the outer surface of the body. More particularly, in this embodiment two concentric tubular sections or pipes are embedded in a solid body, normal to the outside surface. The outer of the two pipes is preferably connected to a source of fluid with a means for pulsing a fluid out of this pipe. The innermost of the two pipes is connected to an appropriate means for pulling fluid down this pipe from the ambient fluid above the planar surface, such as a vacuum or fluid pump. The innermost pipe is situated such that its exit plane is slightly below the planar surface; thus in operation the innermost pipe will constantly pull fluid down its length from the ambient fluid above the flat, planar surface, while the outer pipe is caused to pulse fluid into the ambient environment above the planar surface, thereby causing a fluid jet to form above the constant suction synthetic jet actuator.

In another embodiment of this invention, the synthetic jet actuator employed is as described in U.S. Pat. No 6,056,204, in which the synthetic jet actuators of U.S. Pat. Nos. 5,758,823 and 5,957,413 are aligned perpendicular to the primary fluid flow (e.g. the core air flow, fan air flow or combination thereof as depicted In FIG. 1C of this application). In another embodiment of this invention, a synthetic control jet is attached to the top housing of a primary jet as described in U.S. Pat. No. 6,056,204 such that the direction of flow of the control jet is parallel to the direction of the primary jet flow. If the two jets are operated at the same time, the synthetic control jet actuator will "vector" the primary jet flow.

In yet another embodiment of this invention, the synthetic jet actuator employed is as described in Lachowicz et al., in which the synthetic jet actuator consists of a cavity and rigid plate which serves as the actuation surface. The plate is oscillated vertically such that the plate's motion is displaced uniformly around its length and width. The plate thus acts as a piston, pumping air out of the cavity on the downstroke and sucking air into the cavity on the upstroke. The plate is placed asymmetrically over the cavity opening, forming narrow and wide slots as depicted in FIG. 1 of Lachowicz et al.

Particular embodiments of the invention are described in the following example, which is not meant to limit the invention in any way.

EXAMPLE 1

Figure 2:
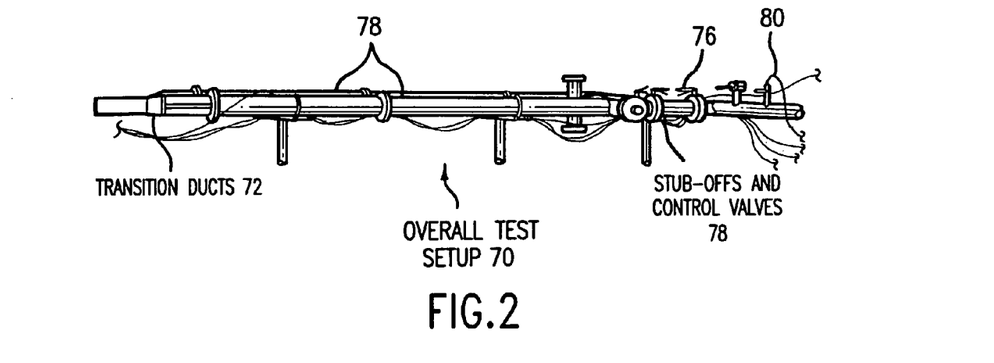
FIG. 2 depicts the overall configuration of the experimental apparatus described in Example 1 herein.

A test apparatus was built to examine the effect of different tab designs. The apparatus consisted of two transition ducts and three different mixer designs. The ducts were attached to a preexisting airflow facility. The overall test setup is shown in FIG. 2.

Control Valve Arrangement

Figure 3:
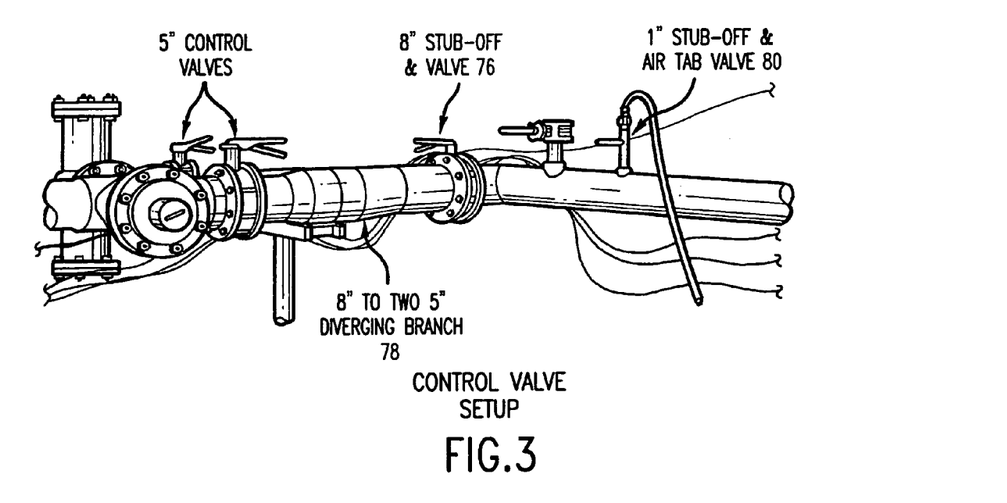
FIG. 3 depicts the control valve arrangement used in the experimental apparatus described in Example 1 herein.

The airflow facility consisted of a series of pipes that attached to 4 large reservoir tanks. The pipes supply to various test facilities. For the described test, an 8" stub-off was used for testing. Air from the 8" stub-off flowed through two diverging branches, each of which was 5" in diameter. Air for the air tab nozzle was supplied from a 1" stub-off from the main supply line. The arrangement is shown in greater detail in FIG. 3.

Transition Ducts

Figure 4:
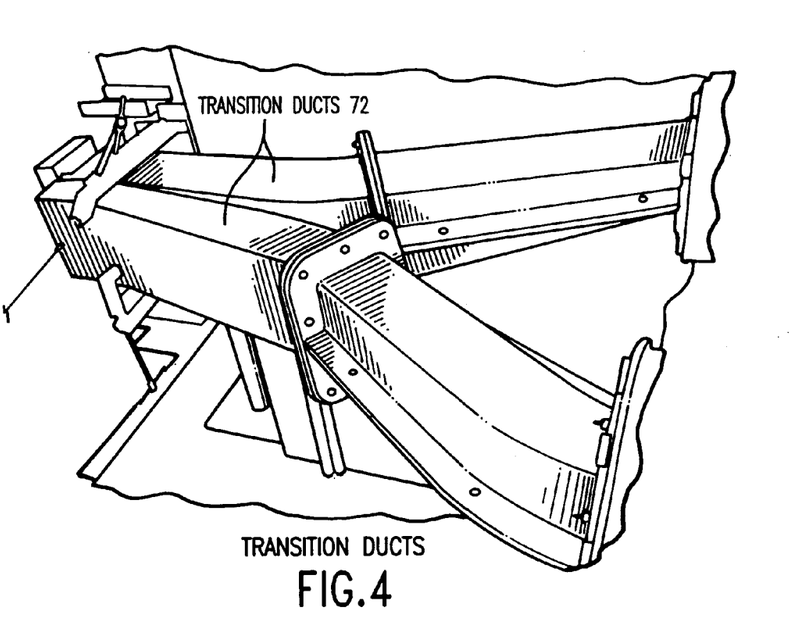
FIG. 4 depicts the transition duct arrangement used in the experimental apparatus described in Example 1 herein.

Transition ducts were mounted at the end of the 5" lines. The ducts were constructed to represent fan and core stream mass flows. Because each 5" line was from the same supply line, the test configuration only allowed for cold flow testing. The transition ducts consisted of a fiberglass section and a steel section. The fiberglass section transitioned from 5" round to a rectangular cross section (3.25"×6" for the core flow and 4"×6" for the fan flow). The steel section turned and reduced the rectangular cross section to the final exit area (2"×6" for the core flow and 3"×6" for the fan flow). The transition ducts are shown in FIG. 4.

Mixer Configurations

Figure 5A:
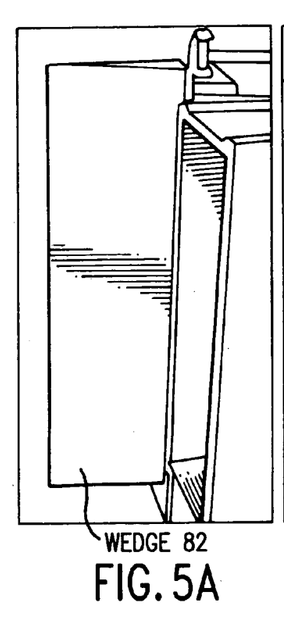
FIG. 5a depicts a wedge splitter plate mixer used in the experimental apparatus described in Example 1 herein.
Figure 5B:
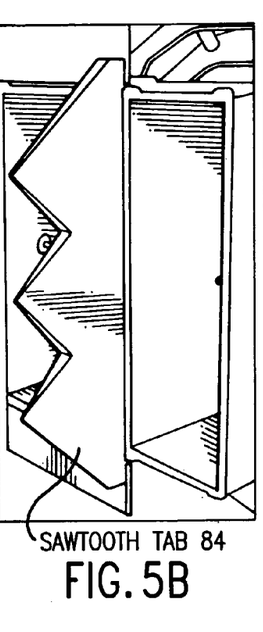
FIG. 5b depicts a sawtoothed shaped tab mixer used in the experimental apparatus described in Example 1 herein.
Figure 5C:
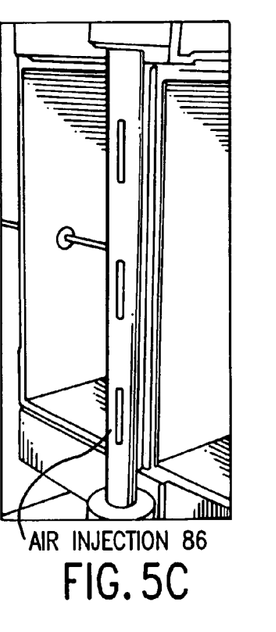
FIG. 5c describes an air injection mixer used in the experimental apparatus described in Example 1 herein.

Three different mixer designs were attached at the end of the transition sections. The first mixer design was a simple wedge splitter plate to represent a typical exhaust nozzle (FIG. 5a). The second was a sawtooth shaped tab mixer (FIG. 5b). All configurations were mechanically fastened to the transition ducts. The air tab mixer was supplied from both ends from the 1" stub-off shown in FIG. 3.

Test Results

Each 5" line was equipped with an orifice plate for mass flow measurements. The largest orifice plates that could be located by the test labs were 3", which significantly reduced the available flow. An alternative approach selected was to remove the orifice plates to allow the maximum amount of flow through the test apparatus. A total pressure probe was installed in the center of the exit plane of each transition duct (assuming an even flow profile at the exit plane). Air temperature was recorded from instrumentation at the orifice plate area of the test setup. Mass flow could then be computed post-test from:

$$\dot{m} = \frac{p_t}{\sqrt{RT_t}} A\sqrt{\gamma} M\left(1 + \frac{\gamma-1}{2}M^2\right)^{\frac{\gamma+1}{2(1-\gamma)}} \text{ and}$$

$$\frac{p_t}{p} = \left(1 + \frac{\gamma-1}{2}M^2\right)^{\frac{\gamma}{\gamma-1}}$$

where $\dot{m}$ is the mass flow rate, A is the cross section area, M is the flow Mach number, $p_t$ is the total pressure, p is the static pressure (assumed to be ambient), $\gamma$ is the gas constant or ratio of specific heats, and $T_t$ is the total temperature.

Total mass flow available from the airflow facility was approximately 11 $lb_m$/s. Core total pressure were varied from 0.5 psig (1.6 $lb_m$/s) to 2.5 psig (3.5 $lb_m$/s). Fan total pressures were varied from 0.5 psig (2.3 $lb_m$/s) to 5.3 psig (7.5 $lb_m$/s). Air injection total pressures were varied from 0.0 psig (0 $lb_m$/s) to 5.0 psig (0.22 $lb_m$/s).

Wedge Mixer

The flow exiting over the wedge mixer was very smooth. The tufts of the flow visualization wand oscillated only a few degrees to either side of the centerline. No useful photos are available.

Saw Tooth Tab Mixer

Figure 6:
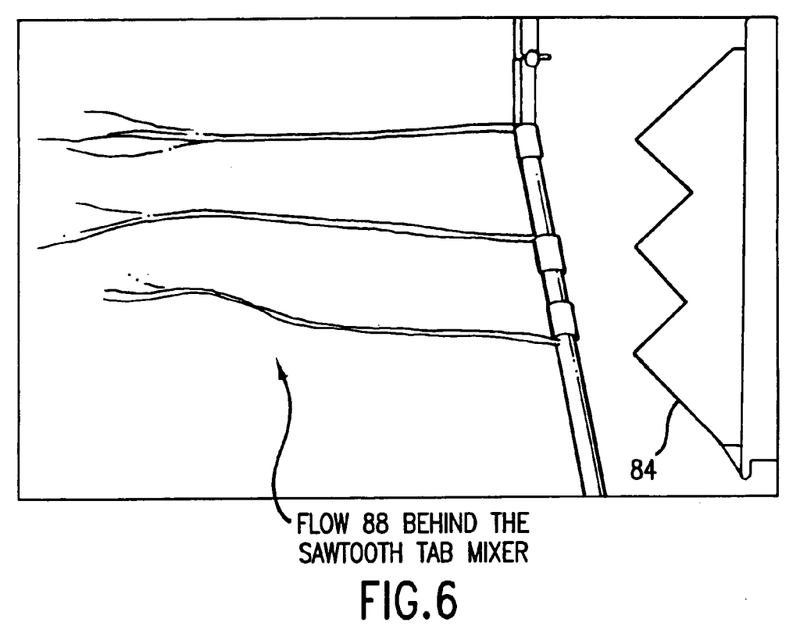
FIG. 6 depicts flow conditions obtained using the sawtoothed shaped tab mixer in the experimental apparatus described in Example 1 herein.

The saw tooth tab mixer significantly disturbed the flow. The shear layer behind the mixer was wider and much more turbulent. Tufts from the flow visualization want showed oscillations of about 15 degrees to either side of the centerline. Vertical oscillations (along the length of the splitter) were small (FIG. 6).

Air Injection Mixer

The flow exiting over the air injection mixer with the air injection off was very smooth. Immediately behind the injector, the flow was somewhat turbulent. A few injector diameters downstream of the injector, however, the flow was similar to the wedge mixer.

Figure 7A:
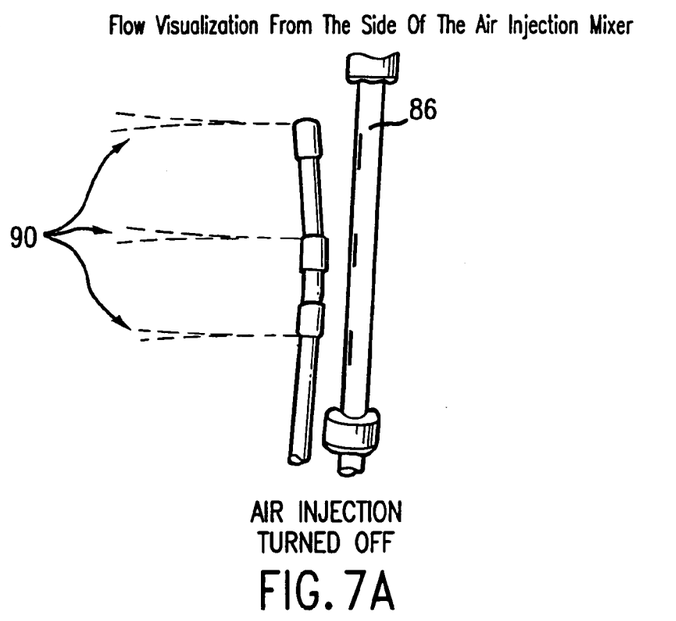
FIGS. 7 and 8 depict flow conditions obtained using the air injection mixer in the experimental apparatus described in Example 1 herein.
Figure 7B:
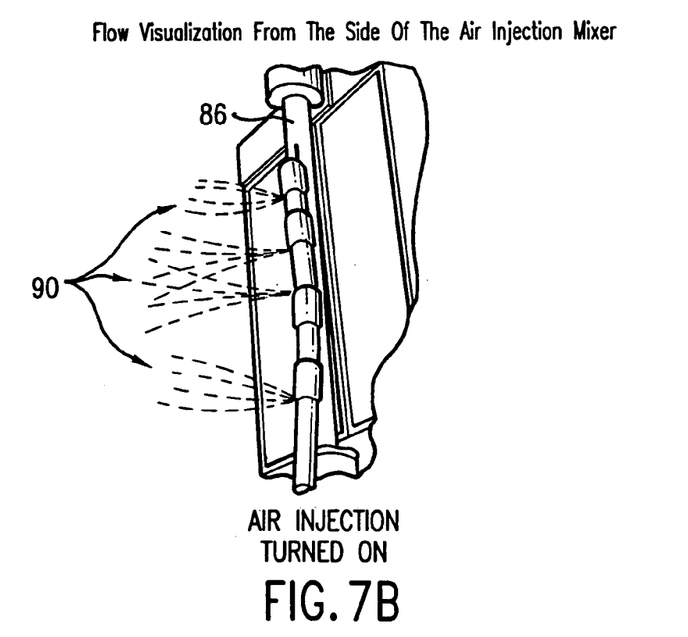
Figure 8A:
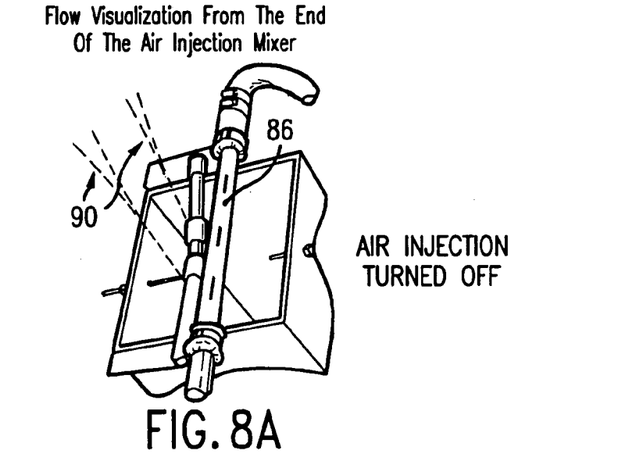
Figure 8B:
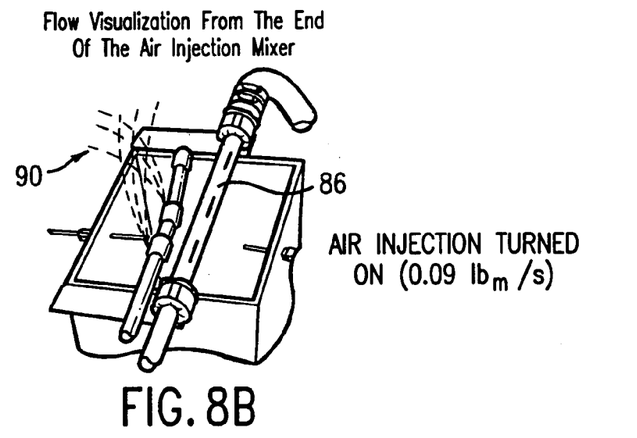
Figure 8C:
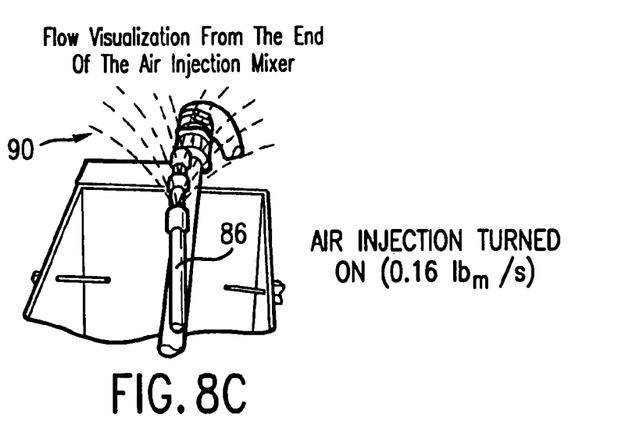
Figure 9A:
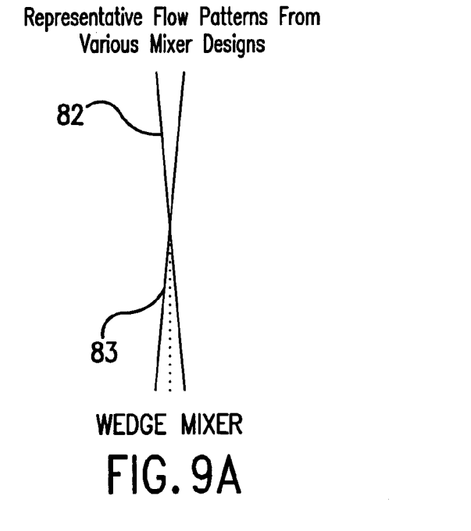
FIG. 9 depicts representative flow patterns for various mixer designs which may be used in the apparatus of this invention.
Figure 9B:
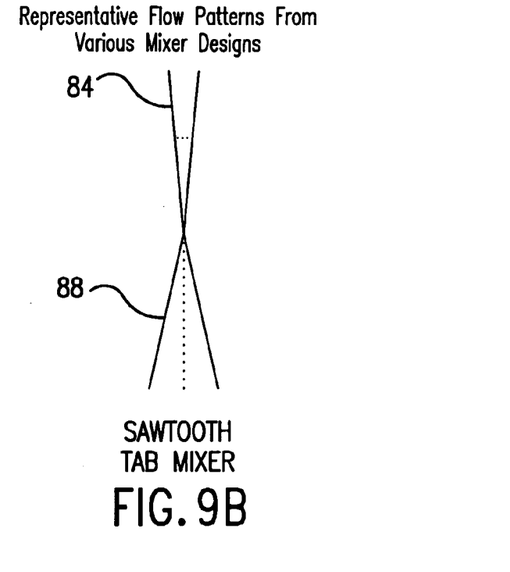
Figure 9C:
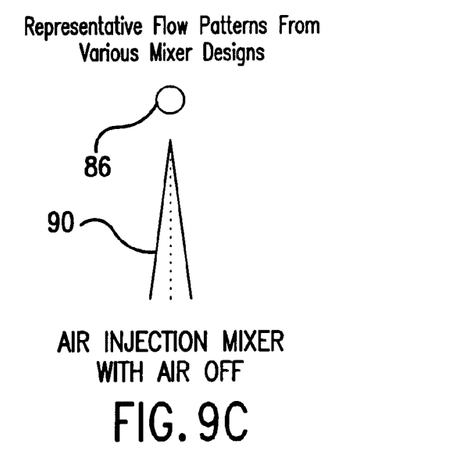
Figure 9D:
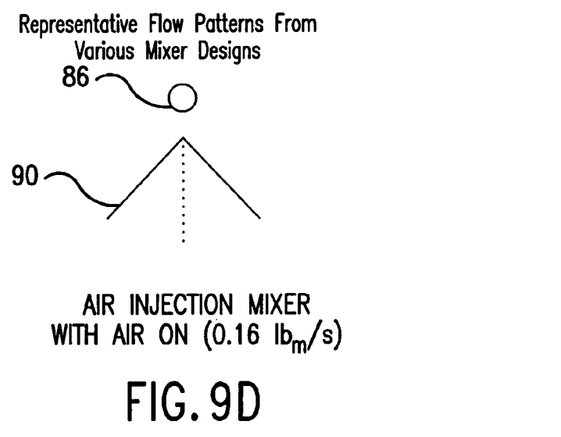

With the injection system turned on, the flow was noticeably disturbed. At the lowest set point for injection (about 0.09 $lb_m$/s), the tufts of the flow visualization wand oscillated about 15 degrees to either side of the centerline (the same as the saw tooth mixer). At higher injection flows, the oscillations increased to about 45 degrees to either side of the centerline. Side displacements of the wand were also noticeably larger with the flow turned on. (See FIGS. 7 and 8).

Comparison of Mixers

FIG. 9 provides a comparison of flow visualization of the different mixers.

CONCLUSIONS

Air requirements (e.g. bleed air requirements) may be a concern for implementation of this system. Air flows used in this example were 4%–7% of the core flow. As a comparison, typical nacelle anti-icing systems use slightly less than 1% bleed of the core flow at takeoff power. Without wishing to be bound by any one theory it is believed that these air flows should scale proportionally to a full scale application. It also should be noted that, unlike an anti-icing system, bleed air flow is exhausted from the back of the engine so some thrust will be obtained, albeit not in the most desired manner.

Due to limitations of the airflow facility, take-off duct pressures (about 27 psia) were not obtainable. The highest duct pressures obtainable were approximately 20 psia. Higher takeoff pressures would require more flow in both the ducts and the injection system.

Figure 10:
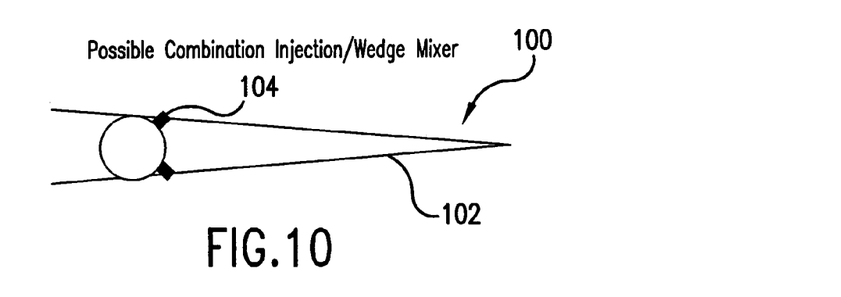
FIG. 10 depicts a representative flow pattern for an injection/wedge combination mixer design which may be used in the apparatus of this invention.

This test was designed to demonstrate the viability of the concept of using air injection to disturb the fan and core flows and hopefully break up large scale, low frequency structures in the flow. The test apparatus was not optimized for production use. Possible additional features and/or improvements of the invention in terms of cruise performance include placing a wedge fairing behind the injector bar to keep the flow moving smoothly behind the mixer when the air supply is off. An embodiment which is a combination injection/wedge mixer is depicted in FIG. 10.

In addition, in the test apparatus the injector supply tube diameter was limited to 0.5" for ease of manufacturing this single piece of test hardware. The actual air delivery system for a production nozzle would probably be different than the test setup. One option is to implement the production nozzle as a spray bar type system. In such a scenario, the diameter of the spray bar will need to be chosen so that the cross section area is much larger than the total injector exit area to ensure uniform flow through the injectors. If the nozzle could be built as a pressure reservoir, then the spray bar diameter is not an issue.

To fully examine additional benefits and uses of the invention, it would be desirable to conduct additional testing in a facility and/or full scale engine tests with acceptable acoustic and flow measurement capabilities.

While preferred embodiments of the present invention have been illustrated and described, it should be understood that variations could be made therein without departing from the spirit and scope of the invention. Accordingly, it is to be understood that the invention is not to be limited to the specific embodiments illustrated and described. Rather the true scope and spirit of the invention are to be determined by reference to the following claims.

The invention claimed is:

1. An apparatus for reducing noise generated by an aircraft gas turbine engine having an engine core with a longitudinal centerline, a core nozzle having an exit plane and fan nozzle having an exit plane, wherein a fan air stream flows between the fan nozzle and the core nozzle and a core air stream flows between the core nozzle and the engine core when the aircraft is in flight, the apparatus comprises at least one gas injector for injecting gas into the fan air stream proximate to the fan nozzle exit plane toward the engine core longitudinal centerline, into the core air stream proximate to the core nozzle exit plane toward the engine core longitudinal centerline, or combination thereof, and the at least one gas injector has a plurality of gas exit ports having a shape which may be slotted ports, circular ports or a combination of slotted ports and circular ports.

2. The apparatus of claim 1, in which the at least one gas injector is crescent-shaped.

3. The apparatus of claim 1, in which the at least one gas injector is located on the fan flow side of the engine nozzle portion exit plane.

4. The apparatus of claim 1, in which the engine has a core side and the at least one gas injector is located on the core side of the engine.

5. The apparatus of claim 1, in which the core nozzle, fan nozzle, or combination thereof comprises flutes for directing the gas.

6. The apparatus of claim 1, in which the engine has a core cowl, and the gas is injected under the cowl.

7. The apparatus of claim 1, in which the gas injected by the at least one gas injector is engine bleed air.

8. The apparatus of claim 1, in which the gas injected by the at least one gas injector is diverted engine core air.

9. The apparatus of claim 1, in which the gas injected by the at least one gas injector is air obtained from a pressurized storage container.

10. The apparatus of claim 1, in which at least one synthetic jet actuator is used to inject gas into the fan air stream proximate to the fan nozzle exit plane toward the engine core longitudinal centerline, into the core air stream proximate to the core nozzle exit plane toward the engine core longitudinal centerline, or combination thereof.

11. The apparatus of claim 10, in which the at least one synthetic jet actuator is used to inject gas into an area proximate to the core air stream.

12. The apparatus of claim 10, in which the at least one synthetic jet actuator is used to inject gas into an area proximate to the fan air stream.

13. The apparatus of claim 10, in which at least a first synthetic jet actuator is used to inject gas into an area proximate to the fan air stream, and at least a second synthetic jet actuator is used to inject gas into an area proximate to the core air stream.

14. A method for reducing noise generated by an aircraft gas turbine engine, the method comprising:
(a) providing an apparatus for reducing noise generated by the gas turbine engine, the engine having an engine core with a longitudinal centerline, a core nozzle having an exit plane and fan nozzle having an exit plane, wherein a fan air stream flows between the fan nozzle and the core nozzle and a core air stream flows between the core nozzle and the engine core when the aircraft is in flight, the apparatus comprising at least one gas injector for injecting gas into the fan air stream proximate to the fan nozzle exit plane toward the engine core longitudinal centerline, into the core air stream proximate to the core nozzle exit plane toward the engine core longitudinal centerline, or combination thereof, and the at least one gas injector having a plurality of gas exit ports having a shape which may be slotted ports, circular ports or a combination of slotted ports and circular ports;
(b) introducing air into the apparatus during a takeoff portion of aircraft flight.

15. The method of claim 14, in which the introduction of air into the apparatus is halted during a cruise portion of the aircraft flight.

16. A system for reducing noise generated by an aircraft gas turbine engine, the system comprising:
(a) a source of gas;
(b) an apparatus for reducing noise generated by the gas turbine engine, the engine having an engine core with a longitudinal centerline, a core nozzle having an exit plane and fan nozzle having an exit plane, wherein a fan air stream flows between the fan nozzle and the core nozzle and a core air stream flows between the core nozzle and the engine core when the aircraft is in flight, the apparatus comprising at least one gas injector for injecting gas into the fan air stream proximate to the fan nozzle exit plane toward the engine core longitudinal centerline, into the core air stream proximate to the core nozzle exit plane toward the engine core longitudinal centerline, or combination thereof, and the at least one gas injector having a plurality of gas exit ports having a shape which may be slotted ports, circular ports or a combination of slotted ports and circular ports.

17. An apparatus for reducing noise generated by an aircraft gas turbine engine, the engine having an engine core with a longitudinal centerline, a core nozzle having an exit plane and fan nozzle having an exit plane, wherein a fan air stream flows between the fan nozzle and the core nozzle and a core air stream flows between the core nozzle and the engine core when the aircraft is in flight, the apparatus comprises at least one gas injector for injecting gas into the fan air stream proximate to the fan nozzle exit plane toward the engine core longitudinal centerline, into the core air stream proximate to the core nozzle exit plane toward the engine core longitudinal centerline, or combination thereof, and the at least one gas injector comprises a gas delivery tube which has a plurality of gas exit ports having a shape which may be slotted ports, circular ports or a combination of slotted ports and circular ports, the engine has an inner barrel, and the tube is circumferentially located around an outer surface of the inner barrel.

* * * * *